(12) United States Patent
Andersson et al.

(10) Patent No.: US 10,857,877 B2
(45) Date of Patent: Dec. 8, 2020

(54) PLANET CARRIER AND A PLANETARY GEAR TRANSMISSION

(71) Applicant: VOLVO CONSTRUCTION EQUIPMENT AB, Eskilstuna (SE)

(72) Inventors: Thomas Andersson, Eskilstuna (SE); Lars Larsson, Mariefred (SE); Ralf Nordström, Torshälla (SE); Jonas Rubinsson, Västerås (SE)

(73) Assignee: Volvo Construction Equipment AB, Eskilstuna (SE)

( * ) Notice: Subject to any disclaimer, the term of this patent is extended or adjusted under 35 U.S.C. 154(b) by 139 days.

(21) Appl. No.: 16/091,143

(22) PCT Filed: Apr. 5, 2016

(86) PCT No.: PCT/SE2016/050283
§ 371 (c)(1),
(2) Date: Oct. 4, 2018

(87) PCT Pub. No.: WO2017/176176
PCT Pub. Date: Oct. 12, 2017

(65) Prior Publication Data
US 2019/0126747 A1 May 2, 2019

(51) Int. Cl.
*F16H 57/10* (2006.01)
*B60K 17/04* (2006.01)
(Continued)

(52) U.S. Cl.
CPC .......... *B60K 17/046* (2013.01); *B60B 35/125* (2013.01); *B60K 17/04* (2013.01);
(Continued)

(58) Field of Classification Search
CPC ...... F16H 57/023; F16H 57/10; F16H 57/082; B60B 35/125; B60K 17/046
(Continued)

(56) References Cited

U.S. PATENT DOCUMENTS 3,756,095 A 9/1973 McCay et al.
4,159,657 A 7/1979 Stilley
(Continued)

FOREIGN PATENT DOCUMENTS

CN 203162114 U 8/2013
CN 204978220 U 1/2016
(Continued)

OTHER PUBLICATIONS

Extended European Search Report for Application No. EP 16898073.8, dated Aug. 13, 2019, 8 Pages.
(Continued)

*Primary Examiner* — Roger L Pang
(74) *Attorney, Agent, or Firm* — Sage Patent Group

(57) ABSTRACT

A planet carrier for a planetary gear transmission for driving a wheel includes a housing for accommodating a sun wheel and planet wheels of a planetary gear transmission. The housing has an inner end and an opposite outer end. The inner end of the housing is provided with an inner end wall having an opening for receiving a drive shaft for driving the sun wheel. The outer end of the housing is provided with an outer end wall having through holes for mounting the planet wheels axially into the housing in the direction from the outer end towards the inner end.

16 Claims, 11 Drawing Sheets

(51) Int. Cl.
- F16D 55/32 (2006.01)
- F16D 65/18 (2006.01)
- B60T 1/06 (2006.01)
- F16H 57/08 (2006.01)
- B60B 35/12 (2006.01)
- F16H 57/023 (2012.01)
- E02F 9/02 (2006.01)
- F16D 55/36 (2006.01)
- F16H 1/28 (2006.01)

(52) U.S. Cl.
CPC ............... B60T 1/06 (2013.01); B60T 1/062 (2013.01); B60T 1/065 (2013.01); E02F 9/02 (2013.01); F16D 55/32 (2013.01); F16D 55/36 (2013.01); F16D 65/186 (2013.01); F16H 1/28 (2013.01); F16H 57/023 (2013.01); F16H 57/08 (2013.01); F16H 57/082 (2013.01); F16H 57/10 (2013.01); *B60Y 2200/415* (2013.01)

(58) Field of Classification Search
USPC .............. 475/331, 323, 159, 160; 180/372
See application file for complete search history.

(56) References Cited

U.S. PATENT DOCUMENTS

| | | | |
|---|---|---|---|
| 4,315,556 A | 2/1982 | Timoney | |
| 5,145,471 A | 9/1992 | Meier-Burkamp | |
| 6,053,838 A * | 4/2000 | Gage | F16H 48/285 475/248 |
| 7,758,466 B2 * | 7/2010 | Kato | B60K 17/346 475/248 |
| 2004/0259679 A1 | 12/2004 | Becquerelle et al. | |
| 2005/0245341 A1 | 11/2005 | Mueller et al. | |
| 2009/0233756 A1 | 9/2009 | Lee et al. | |
| 2011/0092333 A1 * | 4/2011 | Murata | B60K 6/365 475/331 |
| 2012/0196715 A1 * | 8/2012 | Turner | B60K 17/046 475/159 |
| 2013/0308889 A1 | 11/2013 | Vallejo | |
| 2017/0247194 A1 * | 8/2017 | Itoh | F16H 57/0479 |

FOREIGN PATENT DOCUMENTS

| | | |
|---|---|---|
| EP | 0084732 A1 | 8/1983 |
| EP | 2 123 943 A2 | 11/2009 |
| EP | 2 123 943 A3 | 5/2011 |
| EP | 2559913 A1 | 2/2013 |
| GB | 1464101 A | 2/1977 |
| GB | 2073115 A | 10/1981 |
| KR | 100730918 B1 | 6/2007 |
| WO | 03039900 A1 | 5/2003 |
| WO | 2005030519 A1 | 4/2005 |
| WO | WO 2007/004937 A1 | 1/2007 |
| WO | WO 2011/098594 A1 | 8/2011 |
| WO | WO-2016017766 A1 * | 2/2016 ............. B65G 45/04 |

OTHER PUBLICATIONS

International Search Report (dated Dec. 21, 2016) for corresponding International App. PCT/SE2016/050283.

* cited by examiner

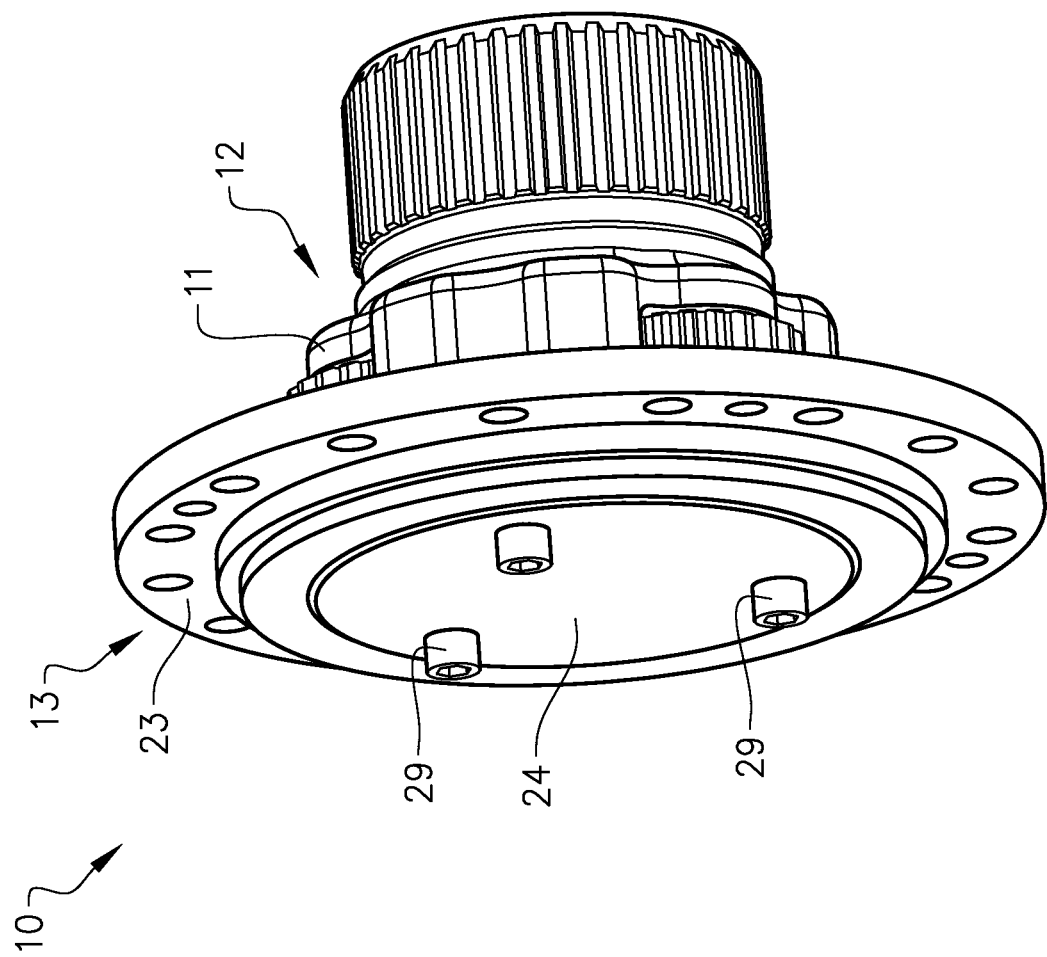

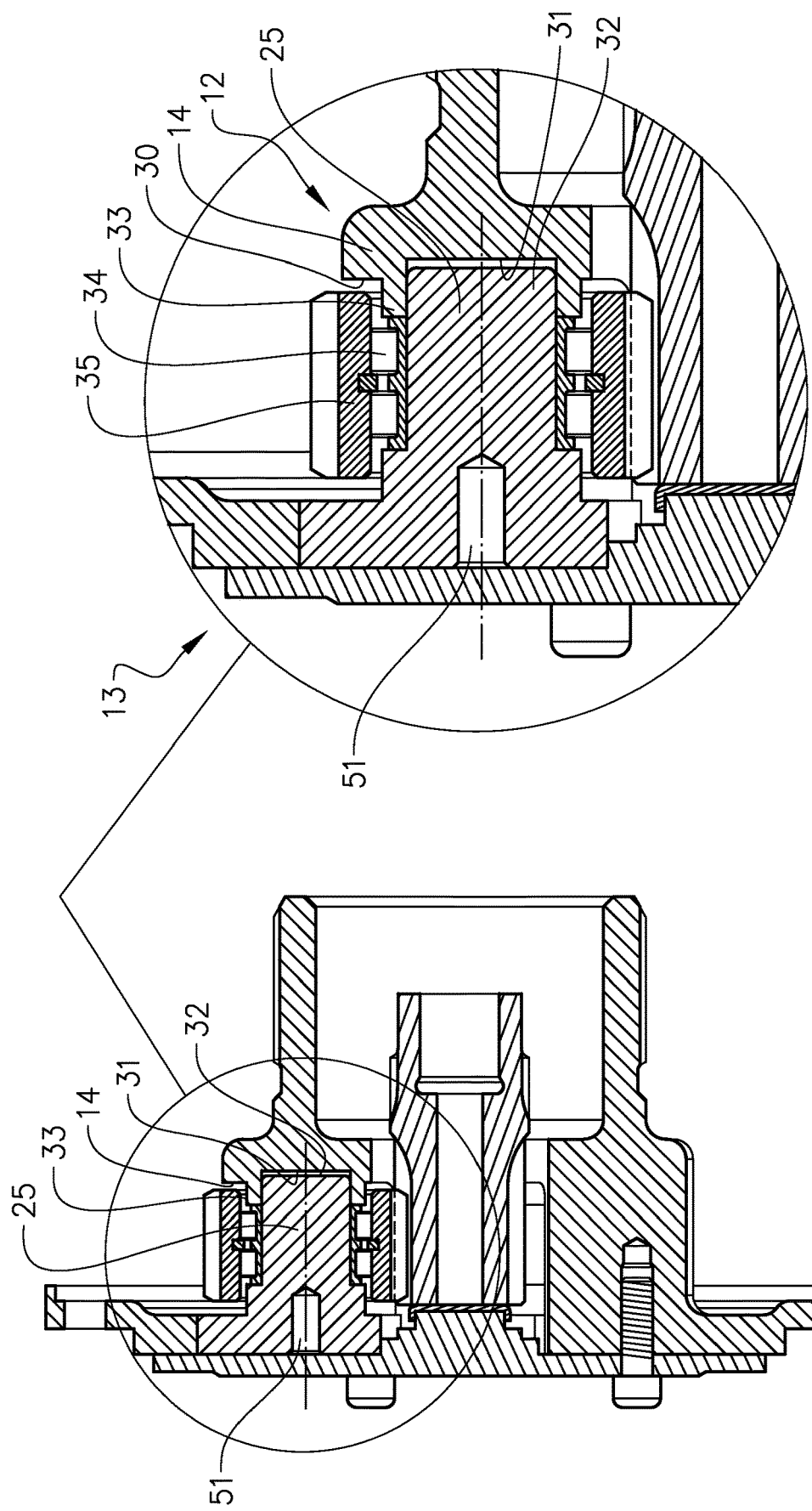

PLANET CARRIER AND A PLANETARY GEAR TRANSMISSION

BACKGROUND AND SUMMARY

The invention relates to a planet carrier and a planetary gear transmission comprising such a planet carrier.

The invention is applicable on different planetary gear transmissions for driving wheels of vehicles, and particularly planetary gear transmissions arranged in hub drive units. The invention can be applied on work machines within the fields of industrial construction machines, such as wheel loaders and articulated haulers.

Although the invention will be described hereinafter with respect to a wheel loader, the invention is not restricted to this particular machine, but may also be used in any other vehicle or planetary gear transmission.

A work machine is provided with a bucket, container or other type of implement for digging, lifting, carrying and/or transporting a load. A work machine may be operated with large and heavy loads in areas where there are no roads, for example for transports in connection with road or tunnel building, sand pits, mines and similar environments.

The wheels of a wheel loader or articulated hauler are usually provided with a reduction gear arranged between the drive shaft and the wheel. The reduction gear can be achieved by a planetary gear transmission arranged close to the wheel. The wheels can be driven by a prime mover, such as an internal combustion engine, where the power is transmitted via a drive line to respective wheel, or by one hub motor arranged for each wheel.

In addition to transmit power to the driving wheels, the planetary transmission usually includes a brake for braking the wheel, preferably a so called wet brake. There are two main types of brakes; drive shaft speed brakes and wheel speed brakes. A drive shaft speed brake is arranged to brake the drive shaft, i.e. prior to the planetary gear transmission, whereas the wheel speed brake is arranged to brake a component rotating with the wheel speed, i.e. after the planetary gear transmission.

For prior art planetary gear transmissions with planet carriers transmitting the gear torque as well as the brake torque of the wheel speed brake to the wheel, it has been a problem to design the planet carrier with the sufficient amount of material for transmitting the requisite torque. This is particularly a problem in hub drive units where the available space is very limited.

Usually, the brake discs are arranged on the protruding planet wheel shafts which have to transmit the brake torque. A disadvantage with such a solution is that the amount of torque that can be transmitted is limited due to high bending stresses in the planet wheel shafts.

It is desirable to provide a planet carrier defined by way of introduction, which planet carrier has an improved strength and/or reduced weight.

By the provision of a planet carrier where the outer end of the housing is provided with an outer end wall having through holes for mounting the planet wheels axially into the housing in the direction from the outer end towards the inner end, the amount of material in the "legs" of the planet carrier housing between the planet wheels can be increased as compared to prior art solutions where the planet wheels are mounted radially. In addition, the planet wheels and the planet wheel shafts are accessible from the outside. This will improve the serviceability. For example, when applied to a planetary gear transmission used in a hub drive unit of a vehicle, the planet wheels and shafts can be assembled or disassembled while the vehicle is standing on the current wheel.

According to one embodiment of the invention, the inner end of the housing is provided with a brake hub having a means for connection to one or more brake discs. By a planet carrier having such a brake hub the brake torque of a wheel speed brake can be transmitted in a favourable way without introducing any undesired stress in the planet wheel shafts.

According to a further embodiment of the invention, the planet carrier is provided with a removable cover for covering the through holes of the outer end wall and the cover is provided with planet wheel shafts for receiving the planet wheels, and preferably the cover and the planet wheel shafts are made in one piece. Hereby, assembling the planetary gear transmission, in a hub drive unit for instance, can be facilitated since the planet wheels can be pre-mounted on the planet wheel shafts and thereafter all the planet wheels and their shafts can be positioned in the housing by assembling the cover to the housing.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3b shows the planet carrier illustrated in FIG. 3a with the cover mounted at the outer end wall of the housing, FIG. 3c is cut view illustrating the planet carrier shown in FIG. 3a FIG. 3d is an enlarged portion of the cut view shown in FIG. 3c, FIG. 6b is a cut view of the hub drive unit illustrated in FIG. 6a.

DETAILED DESCRIPTION

Figure 1:
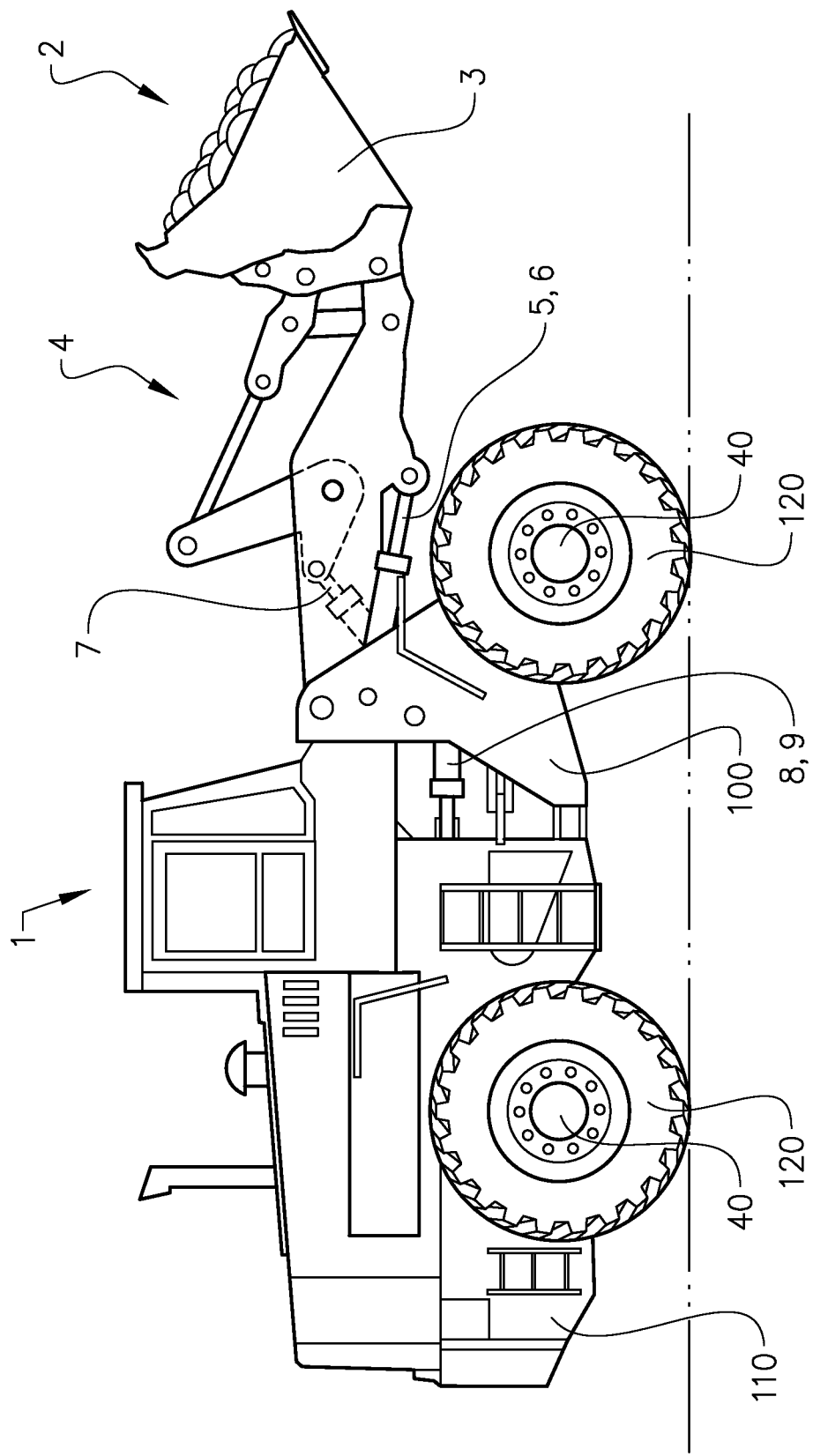
FIG. 1 is a lateral view illustrating a wheel loader having a hub drive unit and a planetary gear transmission according to the invention at each driven wheel.

FIG. 1 is an illustration of a working machine 1 in the form of a wheel loader. The wheel loader is an example of a working machine onto which the invention can be applied.

The wheel loader has an implement 2. The term "implement" is intended to comprise any kind of tool controlled by hydraulics, such as a bucket, a fork or a gripping tool. The implement illustrated is a bucket 3 which is arranged on a load arm 4 for lifting and lowering the bucket 3, and further the bucket can be pivoted or tilted relative to the load arm. In the example embodiment illustrated in FIG. 1 a hydraulic system of the wheel loader comprises two hydraulic cylinders 5, 6 for the operation of the load arm 4 and one hydraulic cylinder 7 for tilting the bucket 3 relative to the load arm 4.

The hydraulic system of the wheel loader further comprises two hydraulic cylinders 8, 9, arranged on opposite sides of the wheel loader 1 for steering the wheel loader by means of relative movement of a front body part 100 and a rear body part 110.

In other words; the wheel loader is articulated frame-steered by means of the steering cylinders 8, 9. There is a pivot joint connecting the front body part 100 and the rear body part 110 of the wheel loader 1 such that these parts are pivotally connected to each other for pivoting about a substantially vertical axis.

The wheel loader is provided with a planetary gear transmission at each wheel 120. Such a planetary gear transmission preferably constitutes a reduction gear. The planetary transmission and thus the wheel can be driven by one drive unit (such as an ICE) and a drive line providing power to all driven wheels or by so called hub drive units, where one hub drive unit 40 is arranged at each driven wheel for proving power to the current wheel. As an example, the planet carrier and planetary gear transmission according to the invention can be used in such a hub drive unit 40 for driving a wheel 120 of a wheel loader 1.

Figure 2B:
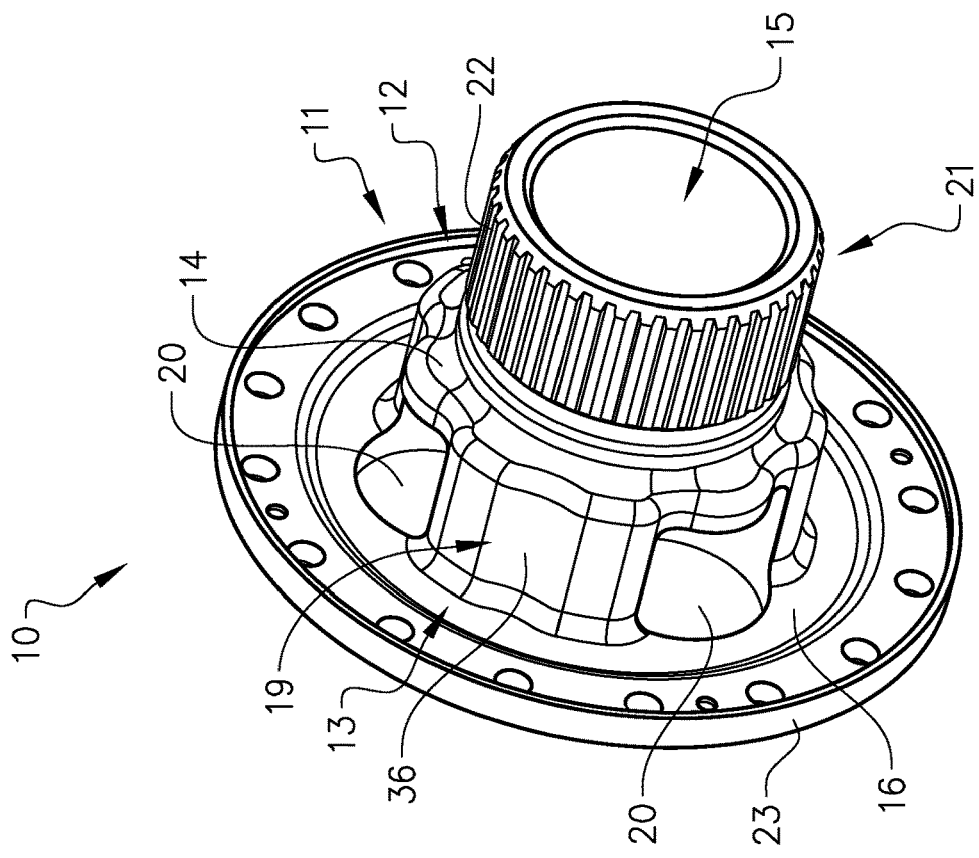
FIG. 2b shows the planet carrier illustrated in FIG. 2a from a different perspective view.
Figure 2A:
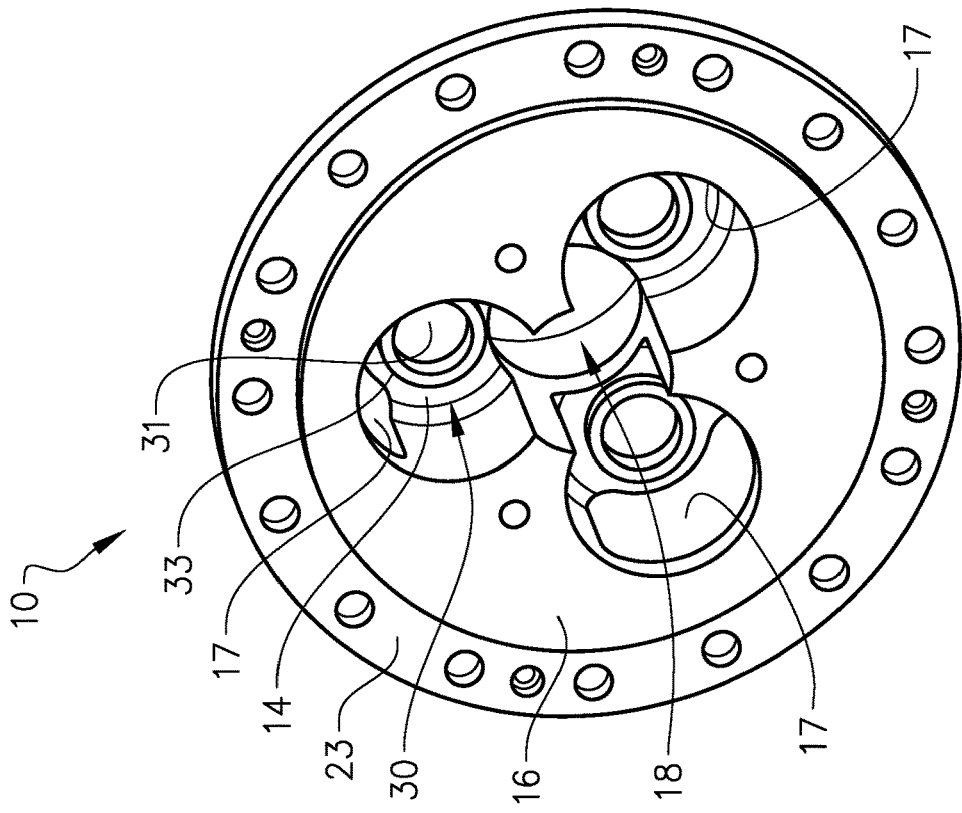
FIG. 2a shows a planet carrier according to the invention in a perspective view.

FIGS. 2a and 2b show in perspective views a planet carrier 10 for a planetary gear transmission for driving a wheel 120. The planet carrier 10 comprises a housing 11 for accommodating a sun wheel and planet wheels of the planetary gear transmission. (The sun wheel and the planet wheels are omitted in FIGS. 2a and 2b.) The housing 11 has an inner end 12 and an opposite outer end 13. The inner end 12 is intended to be faced inwards toward a drive mechanism comprising a drive shaft connected to a drive source or another gear wheel, for driving the planetary gear transmission. The outer end 13 is intended to be faced outwards toward the wheel 120. The inner end 12 of the housing 11 is provided with an inner end wall 14 having an opening 15 for receiving the drive shaft (not illustrated) for driving the sun wheel.

The outer end 13 of the housing 11 is provided with an outer end wall 16 having through holes 17 for mounting the planet wheels axially into the housing 11 in the direction from the outer end 13 towards the inner end 12. The number of through holes 17 is determined by the number of planet wheels of the planetary gear transmission. The through holes are preferably circular and correspond to the shape and size of the planet wheels. The diameter of the through hole 17 has to be somewhat larger than the diameter of the planet wheel. In the embodiment illustrated in FIGS. 2a and 2b, there are three through holes 17 for receiving three planet wheels and corresponding planet wheel shafts. In addition, the outer end wall 16 has a central opening 18 corresponding to the position of the sun wheel. Since this central opening 18 and the through holes 17 overlap with each other, they together form one continuous greater opening.

The housing 11 has also an intermediate portion 19 extending in the longitudinal direction, i.e. the axial direction, which intermediate portion 19 encloses the planet wheels and the sun wheel and connects the inner end wall 14 and the outer end wall 16 to each other. The intermediate portion 19 can be designed as a hollow cylinder. The size (radius) of the intermediate portion 19 of the housing 11 is adapted to the planet wheel size and sun wheel size so as to enclose the planet wheels, but also to provide radial openings 20 for the planet wheels. The planet wheels can protrude radially through the radial openings 20 of the intermediate portion 19 and thereby be engaged to a ring wheel of the planetary gear transmission. Thus, when the planet wheels are mounted, a part of each planet wheel will protrude outside the housing 11 for engagement with the ring wheel.

Since only a small part, much less than half of the planet wheel, has to protrude outside the housing 10 for engagement with the ring gear and the planet wheel can be mounted axially (instead of radially) by means of the through holes 17, the opening 20 can be made smaller than the diameter of the planet wheel. This in turn allows the "legs" 36, i.e. the portions of the housing 11 between the openings 20, to be as large as possible.

These radial openings 20 can suitably be achieved by letting the through holes 17 continue into the intermediate portion 19 to a depth adapted to the length of the planet wheels.

In this example embodiment the inner end 12 of the housing 11 is provided with a brake hub 21 having a means 22 for connection to one or more brake discs. The connection means 22, such as splines, a wedge, etc., is arranged for receiving the brake discs and locking the brake discs from rotation relative to the brake hub 21. The brake hub 21 can be in the shape of a ring or hollow cylinder arranged at the inner end wall 14. The brake hub 21 is arranged around the longitudinal drive axis of the planetary gear transmission. In this example embodiment the brake hub 21 is provided with splines 22 for engagement with the brake discs to be mounted on the brake hub 21. The splines 22 extend in the axial direction along the length of the brake hub 21. The housing 11 and the brake hub 21 are preferably made in one piece, for example by casting.

The outer end 13 of the housing 11 has a flange 23 for connection to a wheel hub. The housing 11 and the wheel flange 23 are preferably made in one piece, for example by casting. Since the brake is arranged to reduce the speed of the planet carrier 10 connected to the wheel 120 via said wheel flange 23, the brake constitutes a so called wheel speed brake.

Figure 3A:
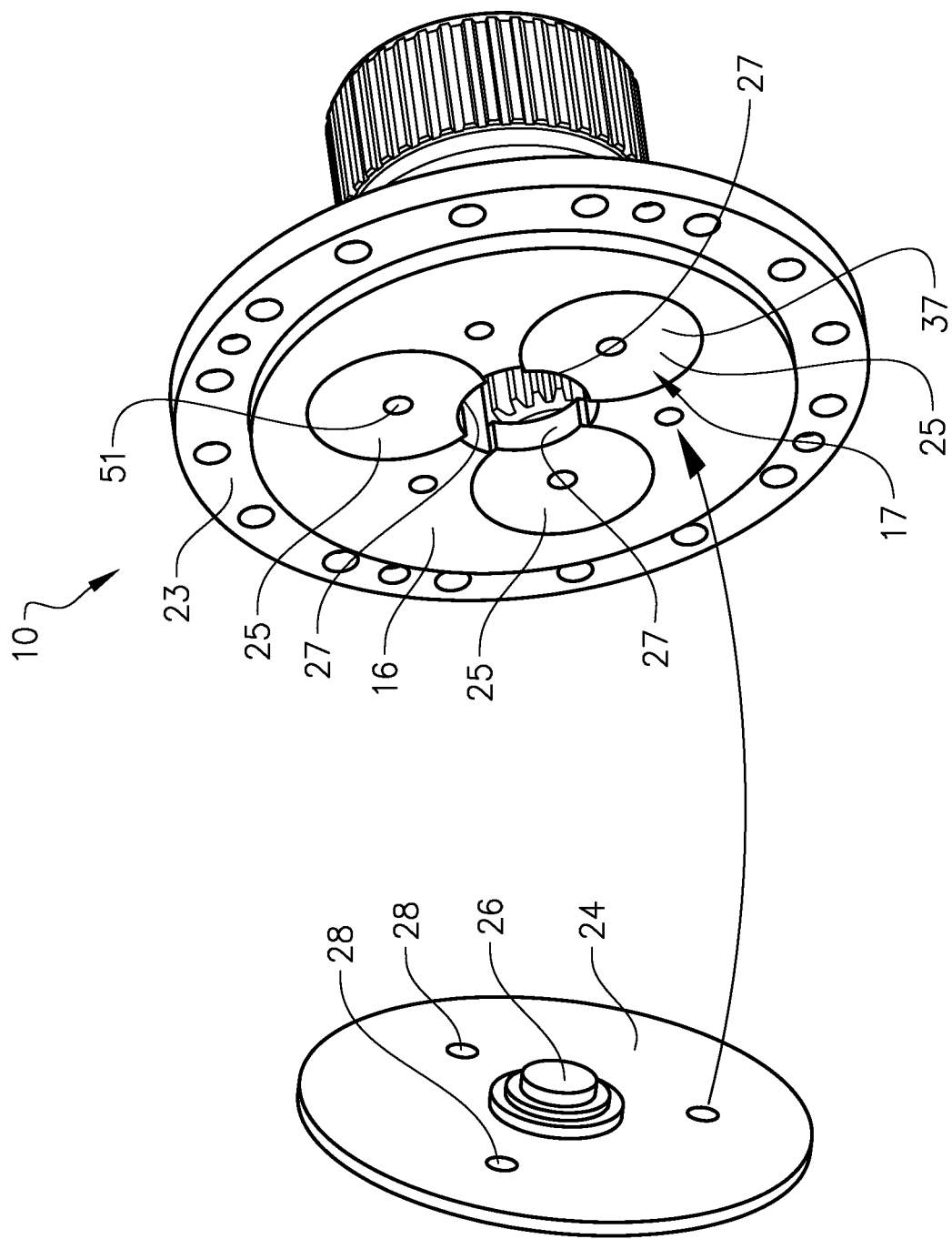
FIG. 3a shows the planet carrier illustrated in FIGS. 2a and 2b, where planet wheels and planet wheel shafts are mounted, and the planet carrier further comprises a cover for covering the through holes of the planet carrier.

As can be seen from FIGS. 3a and 3b, the planet carrier 10 is suitably provided with a removable cover 24 for covering the through holes 17, and any hole for the sun wheel, of the outer end wall 16. In the example embodiment, the cover 24 is also arranged for locking planet wheel shafts 25 against rotation relative to each other and the housing 11. The cover 24 can have at least one protrusion 26 for engagement with the planet wheel shafts 25. The protrusion 26 is preferably arranged substantially concentrically along the axial axis of the planetary gear transmission. The protrusion 26 protrudes from the remaining part of the cover 24 in the axial direction from the outer end 13 towards the inner end 12 of the housing 11. The outer end 37 of each planet wheel shaft 25 has a recess 27 for receiving at least a part of the protrusion 26 and thereby the locking effect can be achieved when the cover is mounted. Although an embodiment where one protrusion is used for locking all planet wheel shafts has been described hereinabove, other embodiments are possible. For example, the cover could be provided with a protrusion for each planet wheel shaft.

In FIG. 3a the cover 24 is removed from the planet carrier 10 and the outer ends 37 of the planet wheel shafts 25 can be seen positioned in the through holes 17 of the outer end wall 16. In addition to allow the planet wheels to pass through, the shape and size of the respective through hole 17 are preferably adapted to receive an outer end of a respective planet wheel shaft 25, and the outer end wall 16 is suitably adapted to support the planet wheel shaft 25. In this example embodiment the outer end 37 of the planet wheel shaft 25 is supported radially by the outer end wall 16. Although the planet wheel shaft 25 in the example embodiment illustrated in FIG. 3a is rotationally supported and locked by means of the cover, in an alternative embodiment the planet wheel shaft could be rotationally supported by the outer end wall.

The outer end 37 of the planet wheel shaft 25 has preferably a hole 51 which can be threaded to facilitate mounting of the planet wheel shaft 25 and the planet wheel 35 to the planet carrier 10.

The cover 24 has preferably through holes 28 for receiving screws for mounting the cover 24 to the outer end wall 16. The screw joint positions for connecting the cover 24 to the housing 11 are separated from the positions for connecting the flange 23 to the wheel hub. The screw joint positions for connecting the cover 24 to the housing 11 are also preferably separated from the positions for connecting the planet carrier to an outer bearing ring 44 of a wheel bearing 42, see also FIG. 6b. In FIG. 3b the cover 24 is mounted on the outer end wall 16 of the housing 11 by means of screw joints 29 arranged at the trough holes 28 of the cover 24.

As can be seen from FIG. 2a, 3c and FIG. 3d, the inside 30 of the inner end wall 14 of the housing 11 has a respective recess 31 for receiving an inner end 32 of a respective planet wheel shaft 25. The inner end wall 14 is thus adapted to support the planet wheel shaft 25. Furthermore, a circumference portion 33 of the inner end wall 14 in the vicinity of the respective planet wheel shaft recess 31 is adapted to support a planet wheel bearing 34 in the axial direction from the inner end 12 towards the outer end 13.

Figure 3E:
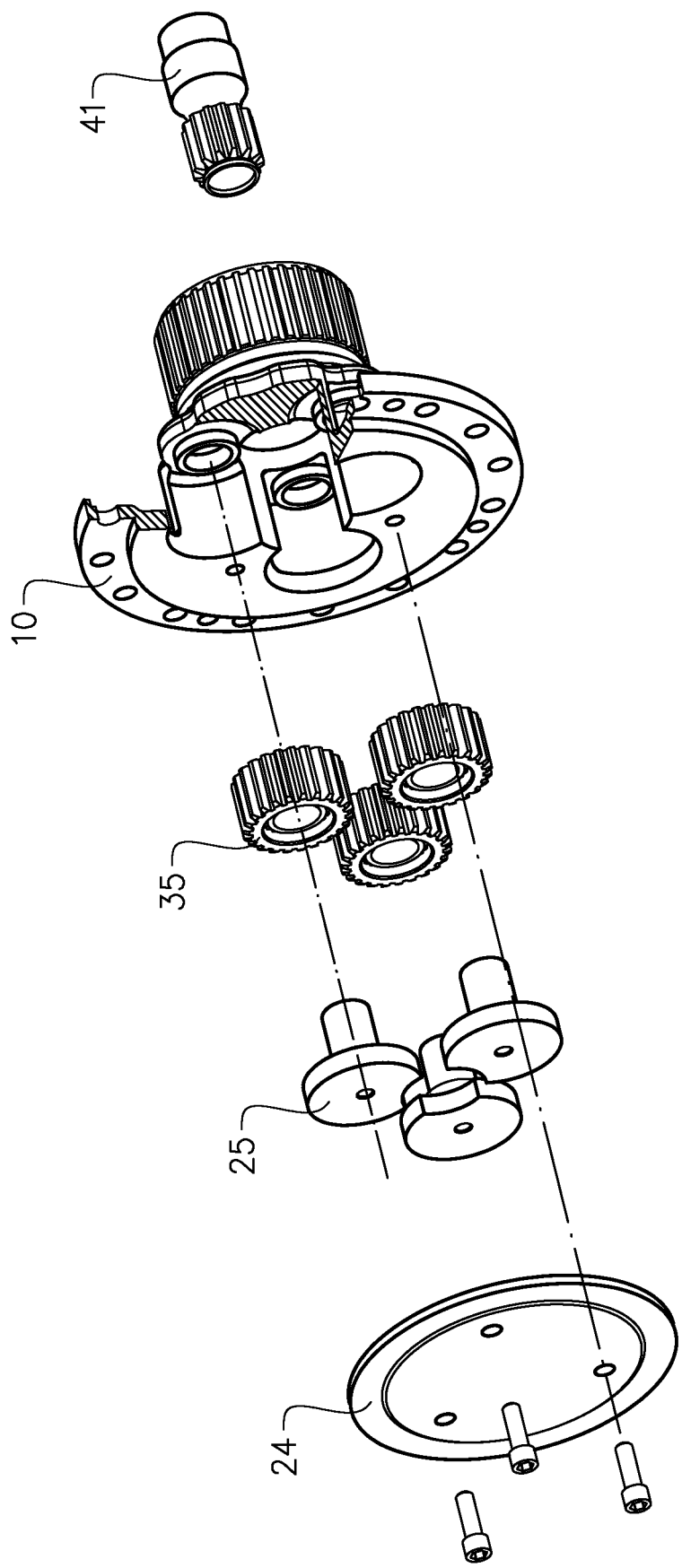
FIG. 3e is an exploded view illustrating the planet carrier shown in FIG. 3a, FIG. 4a shows a further embodiment of the planet carrier according to the invention in a perspective view.

FIG. 3e is an exploded view illustrating the cover 24, the planet wheel shafts 25, the planet wheels 35, the planet carrier 10 and a drive shaft provided with the sun wheel 41 intended to be engaged with the planet wheels 35.

Figure 4B:
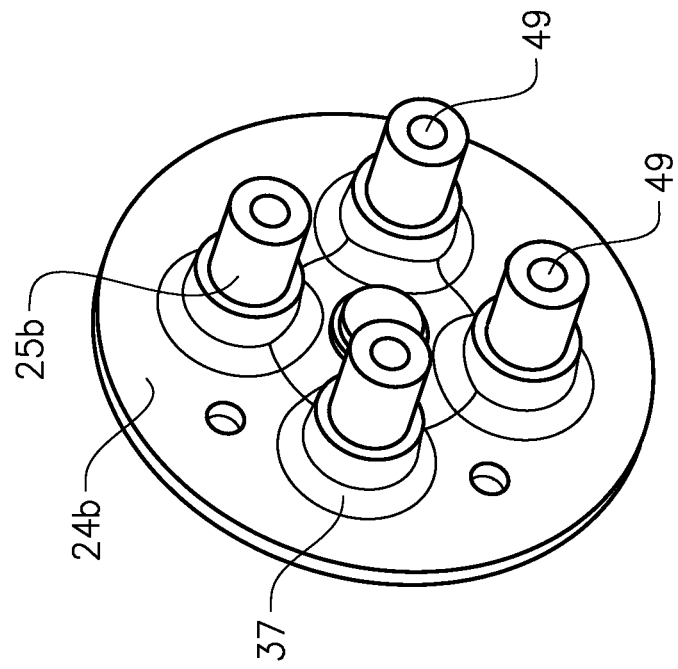
FIG. 4b shows in a perspective view a cover for covering the through holes of the planet carrier illustrated in FIG. 4a, where the cover is provided with planet wheel shafts.
Figure 4A:
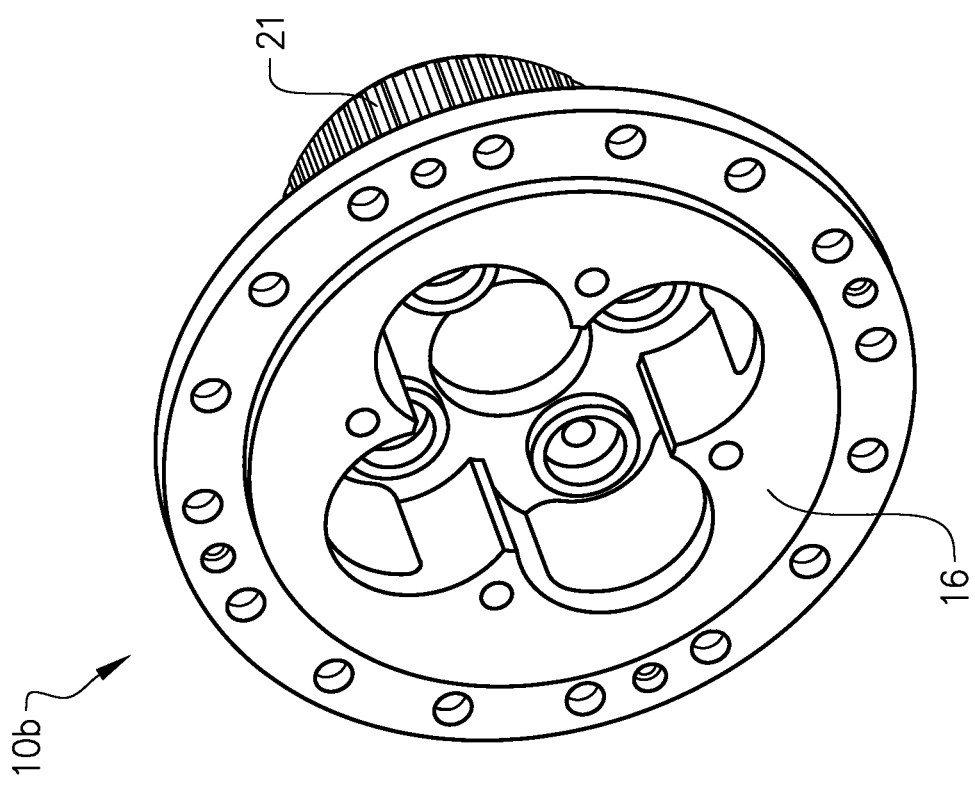
FIG. 4c shows the cover illustrated in FIG. 4b with schematically indicated planet wheels mounted on the planet wheel shafts.
Figure 4C:
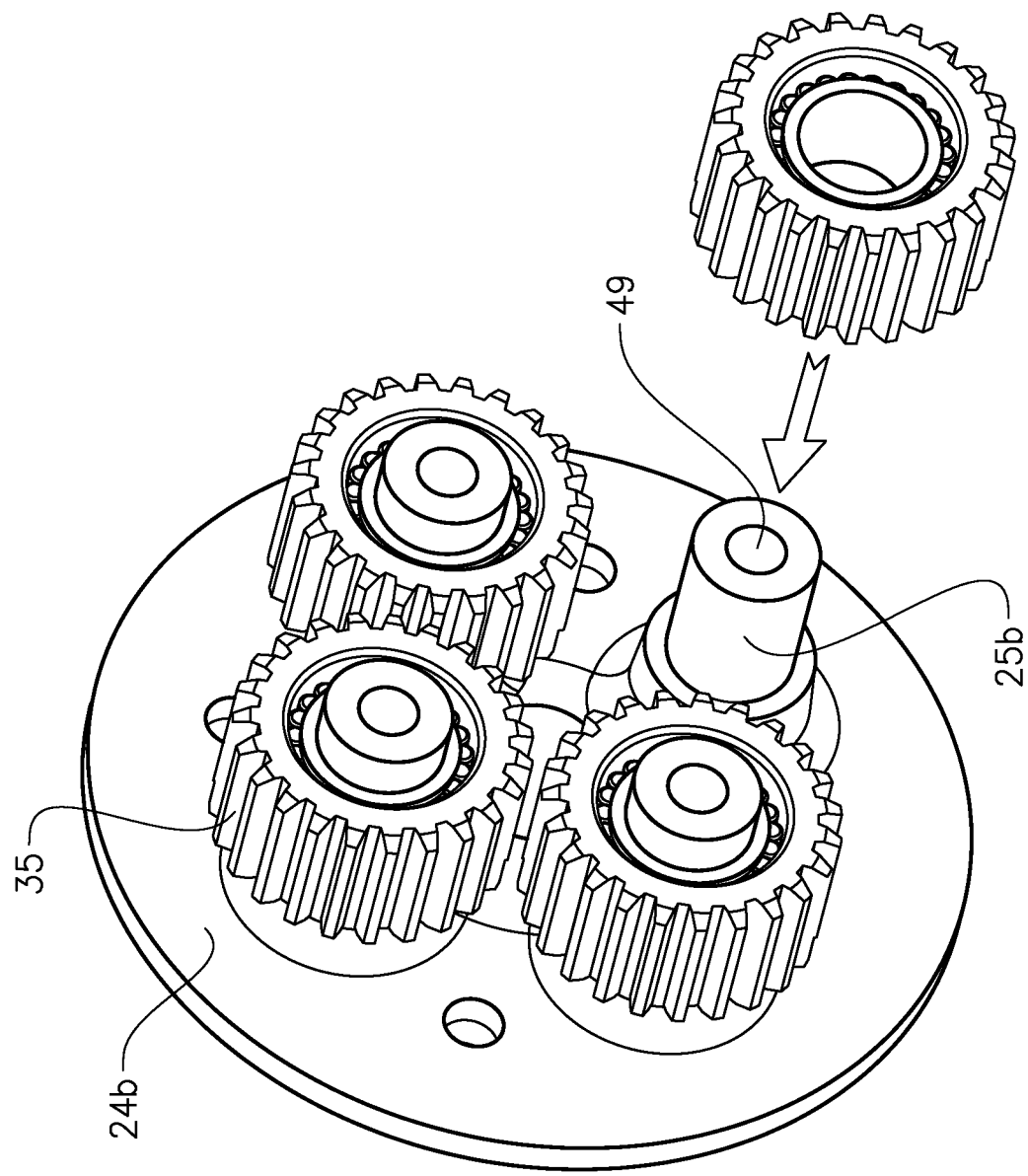

In FIGS. 4a, 4b and 4c, a further embodiment of the planet carrier 10b according to the invention is illustrated. Only features and functions unique for this example embodiment of the planet carrier 10b will be described in detail. Same reference numerals as used in previous figures will indicate same or similar components as already described with reference to these previous figures, and hereinafter some of these components will only be briefly described or not described at all. As appears from FIG. 4b, the cover 24b is provided with the planet wheel shafts 25b for receiving the planet wheels. The cover 24b and the planet wheel shafts 25b can be connected to each other by welding, a screw joint or any suitable joint method, or the cover and the planet wheel shafts can preferably be made in one piece, by casting for instance.

Although different numbers of planet wheels can be used, in this example embodiment the planet carrier 10b is casted and designed for four planet wheels. In FIG. 4c the planet wheel shafts 25b being integral with the cover 24b are shown with planet wheels 35 mounted on the planet wheel shafts 25b. When the planet wheels 35 and the planet wheel shafts 25b are mounted in the planet carrier 10b, the planet wheel shafts 25b are supported by the cover 24b at the outer ends 37 of the planet wheel shafts 25b, but it would be possible to adapt the ends 37 of the planet wheel shafts 25 closest to the cover 24 and the outer end wall 16 correspondingly, such that the planet wheel shafts are supported radially and/or rotationally by the outer end wall.

In this example embodiment illustrated in FIGS. 4a-4c, a through hole 49 is provided in each planet wheel shaft 25b for attachment of the planet wheel shafts to the housing 11 of the planet carrier 10b. See also the cut view in FIG. 6b where the planet wheel shafts 25b are attached by screws 50.

Figure 5:
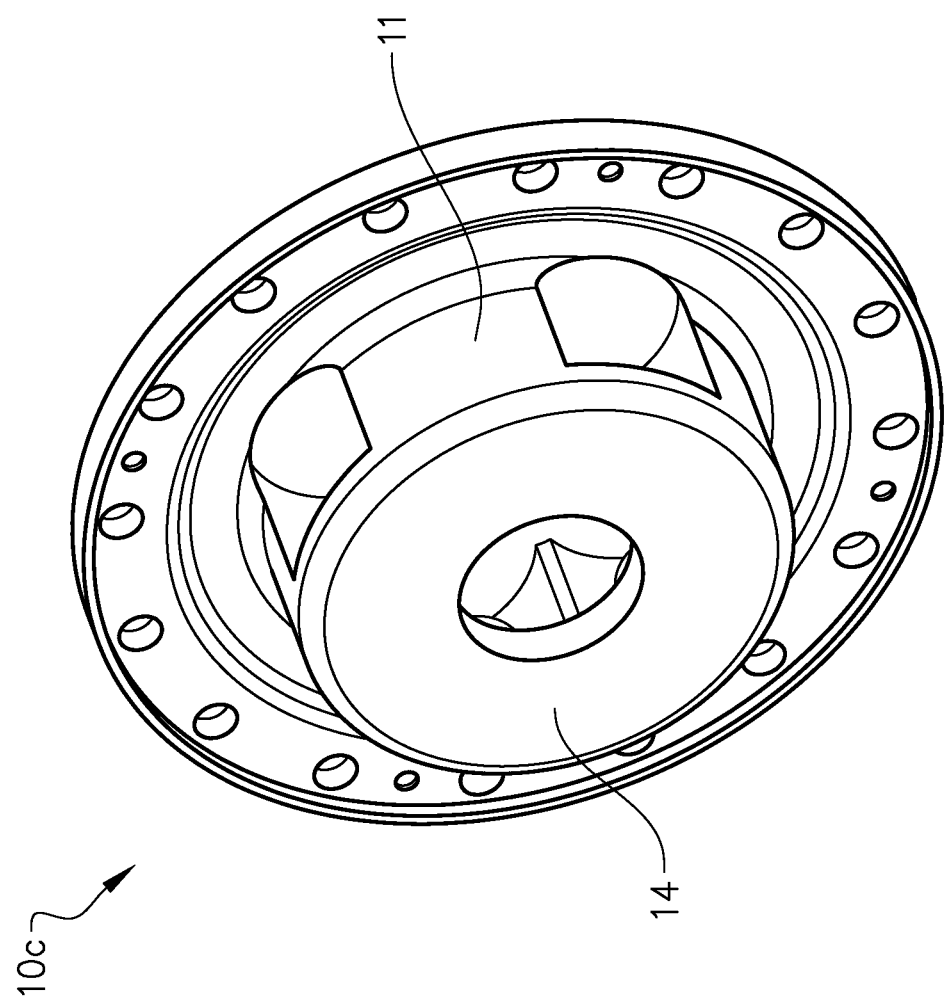
FIG. 5 shows a further embodiment of the planet carrier according to the invention in a perspective view.

FIG. 5 illustrates a further example embodiment of the planet carrier 10c according to the invention. This planet carrier 10c is similar to the planet carriers already described hereinabove with the exception that it has no brake hub arranged at the inner end wall 14 of the housing 11. Hereby the length of this planet carrier 10c can be reduced. For some applications this is important for achieving a compact planetary gear transmission. This planetary gear transmission without any integrated brake of the planet carrier 10c is suitably used together with a drive shaft speed brake.

Figure 6A:
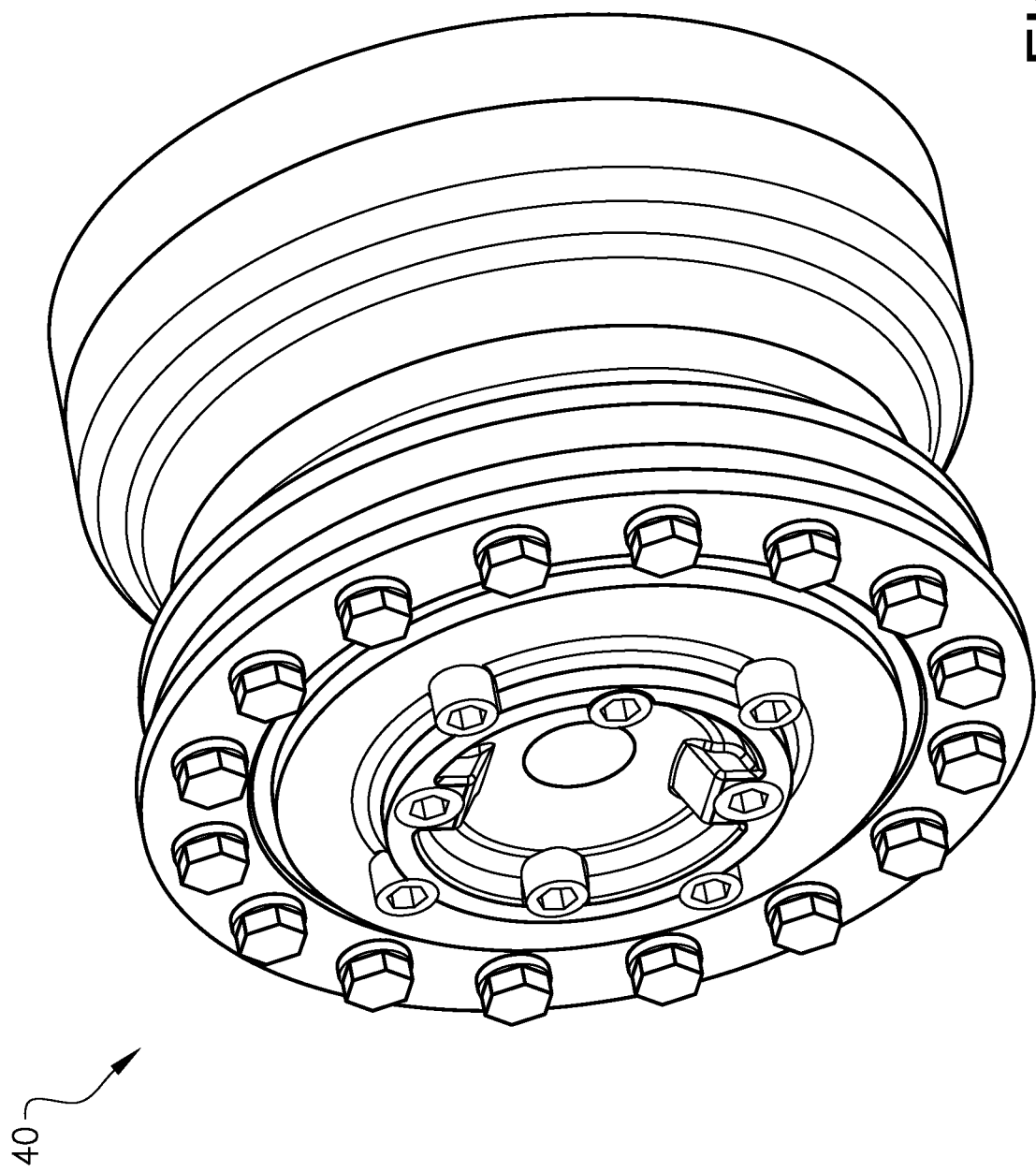
FIG. 6a is a perspective view of a hub drive unit comprising a planetary gear transmission according to the invention.
Figure 6B:
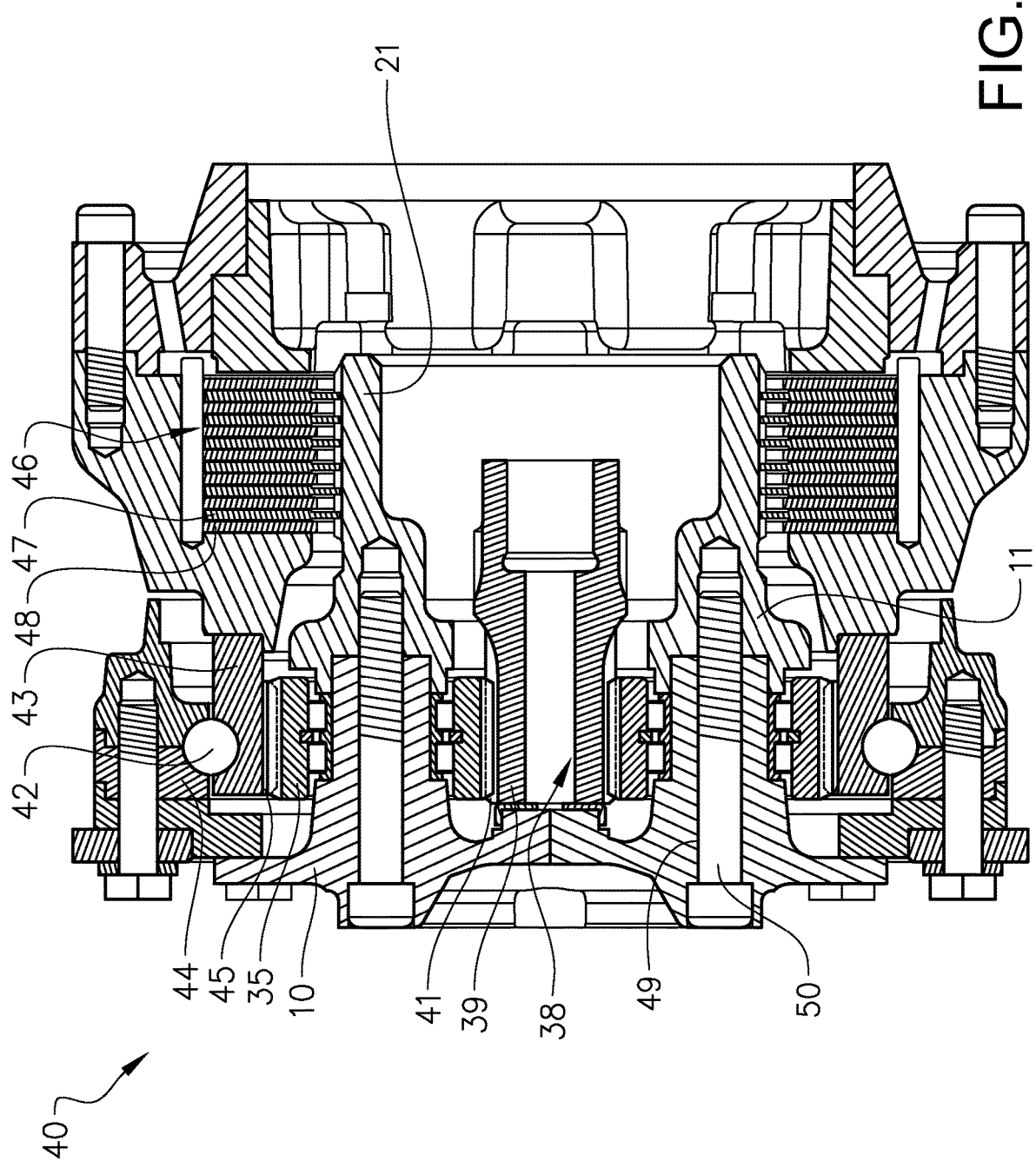

In FIGS. 6a and 6b, an example of a hub drive unit 40 is illustrated. As appears from the cut view in FIG. 6b, the hub drive unit 40 comprises a planetary gear transmission 38. The planetary gear transmission comprises a planet carrier 10 according to the invention. In this example embodiment a planet carrier according to FIGS. 4a, 4b and 4c is comprised in the planetary gear transmission. The hub drive unit 40 further comprises a hub motor (not illustrated) for driving the drive shaft 39 provided with the sun wheel 41. The sun wheel 41 in turn is arranged to drive the planet wheels 35. The planet wheels 35 in turn are engaged with a ring wheel 45. The planet carrier 10 is supported by a wheel bearing 42. The inner bearing ring 43 of the wheel bearing 42 is arranged in the housing of the hub drive unit 40 and constitutes the ring wheel 45 by providing cogs on the inside thereof. The outer bearing ring 44 of the wheel bearing 42 is connected to the planet carrier 10 as well as to the wheel hub via the wheel flange.

The planetary gear transmission also comprises a brake 46. The brake 46 is a wheel speed brake. The planet carrier 10 is provided with the brake hub 21 and a first set of brake discs 47 are arranged on the brake hub 21. A second set of brake discs 48 are arranged in the housing of the hub drive unit 40. Thus, the first set of brake discs 47 rotate with the planet carrier 10 and the second set off brake discs 48 are stationary arranged in the housing of the drive hub unit 40. By stationary means rotationally locked, but the brake discs can be displaceable in the axial direction for enabling the package of brake discs to be pressed together for achieving the brake force. The brake discs 47, 48 are arranged to overlap relative to each other when seen in the axial direction and the two sets of brake discs are preferably arranged alternating (in the axial direction) with one first set brake disc, one second set brake disc, one first set brake disc, and so on.

It is to be understood that the present invention is not limited to the embodiments described above and illustrated in the drawings; rather, the skilled person will recognize that many changes and modifications may be made within the scope of the appended claims. For example, different number of planet wheels and sizes of planet wheel and/or sun wheel can be used.

The invention claimed is:

1. A planet carrier for a planetary gear transmission for driving a wheel, the planet carrier comprising a rotatable housing for accommodating a sun wheel and planet wheels of a planetary gear transmission, the housing having an inner end and an opposite outer end, the inner end of the housing being provided with an inner end wall having an opening for receiving a drive shaft for driving the sun wheel, wherein the outer end of the housing is provided with an outer end wall having through holes for mounting the planet wheels axially into the housing in the direction from the outer end towards the inner end, wherein the planet wheels protrudes radially outside the housing the inner end of the housing is provided with a brake hub having a connection for one or more brake discs.

2. A planet carrier according to claim 1, wherein the connection comprises splines.

3. A planet carrier according to claim 1, wherein the housing and the brake hub are made in one piece.

4. A planet carrier according to claim 1, wherein the outer end of the housing has a flange for connection to a wheel hub.

5. A planet carrier according to claim 4, wherein the housing and the flange are made in one piece.

6. A planet carrier according to claim 1, wherein the planet carrier is provided with a removable cover for covering the through holes of the outer end wall.

7. A planet carrier according to claim 6, wherein the cover is arranged for locking planet wheel shafts against rotation relative to each other and the housing.

8. A planet carrier according to claim 7, wherein the cover has at least one protrusion for engagement with the planet wheel shafts, the protrusion protruding from the cover in the axial direction from the outer end towards the inner end.

9. A planet carrier according to claim 6, wherein the cover is provided with planet wheel shafts for receiving the planet wheels.

10. A planet carrier according to claim 9, wherein the cover and the planet wheel shafts are made in one piece.

11. A planet carrier according to claim 4, wherein the planet carrier is provided with a removable cover for covering the through holes of the outer end wall, and positions for connecting the cover to the housing are separated from the positions for connecting the flange to the wheel hub.

12. A planet carrier according to claim 1, wherein an inside of the inner end wall of the housing has a respective recess for receiving an inner end of a respective planet wheel shaft, the inner end wall being adapted to support the planet wheel shaft.

13. A planet carrier according to claim 12, wherein a circumference portion of the inner end wall in the vicinity of the respective planet wheel shaft inner end recess is adapted to support a planet wheel bearing in the axial direction from the inner end towards the outer end.

14. A planet carrier according to claim 1, wherein a shape and size of each respective through hole is adapted to receive an outer end of a respective planet wheel shaft, the outer end wall being adapted to support the planet wheel shaft.

15. A planetary gear transmission comprising a planet carrier according to claim 1.

16. A hub drive unit for a work machine, the hub drive unit comprising a planetary gear transmission according to claim 15.

* * * * *